(12) United States Patent
Rüffer et al.

(10) Patent No.: US 9,234,515 B2
(45) Date of Patent: Jan. 12, 2016

(54) MOTOR PUMP UNIT

(75) Inventors: Manfred Rüffer, Sulzbach (DE); Jens Bacher, Frankfurt am Main (DE); Heinrich Kreh, Florstadt (DE); Lazar Milisic, Kelkheim (DE); Michael Jürging, Kelkheim (DE); Marcel Niepenberg, Erzhausen (DE); Jose Gonzalez, Bad Oeynhausen (DE); Harald König, Ober-Mörlen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 83 days.

(21) Appl. No.: 13/515,628

(22) PCT Filed: Dec. 16, 2010

(86) PCT No.: PCT/EP2010/069892
§ 371 (c)(1),
(2), (4) Date: Jul. 9, 2012

(87) PCT Pub. No.: WO2011/073318
PCT Pub. Date: Jun. 23, 2011

(65) Prior Publication Data
US 2012/0269664 A1   Oct. 25, 2012

(30) Foreign Application Priority Data
Dec. 18, 2009 (DE) .......................... 10 2009 054 941

(51) Int. Cl.
*F04B 43/02* (2006.01)
*B60T 13/569* (2006.01)
(Continued)

(52) U.S. Cl.
CPC .............. *F04B 43/026* (2013.01); *B60T 13/569* (2013.01); *F04B 43/04* (2013.01); *F16J 3/02* (2013.01); *B60T 17/02* (2013.01)

(58) Field of Classification Search
CPC ........ F04B 43/026; F04B 43/04; B60T 17/02; B60T 13/569; B60T 13/567; B60T 13/56; F16J 3/02; F16J 7/00

USPC ................... 417/413.1; 92/249, 248, 99, 140; 74/579 R, 579 E, 595–605, 606 R; 384/457
See application file for complete search history.

(56) References Cited

U.S. PATENT DOCUMENTS 1,789,728 A * 1/1931 Cox .............................. 384/457
3,590,852 A * 7/1971 Yamane ........................ 137/223
(Continued)

FOREIGN PATENT DOCUMENTS

DE           3529978 A1   3/1987
DE    102007005223 A1 *  9/2007
(Continued)

OTHER PUBLICATIONS

International Search Report corresponding to application No. PCT/EP2010/069892 dated Mar. 9, 2011.

*Primary Examiner* — Devon Kramer
*Assistant Examiner* — Joseph Herrmann
(74) *Attorney, Agent, or Firm* — RatnerPrestia

(57) ABSTRACT

A motor-pump unit, for providing pressure for a brake actuating device having a pneumatic brake booster including a pump and an electric motor driving the pump, the pump being a dual diaphragm pump having two opposed working diaphragms, each of which is clamped between a pump casing and a working chamber cover and delimits a working chamber, and moveable by a crank drive having connecting rods and bearings, the working diaphragm connected firmly to a tappet and, together with the connecting rod, in each case forming a diaphragm unit. In order to provide a low-noise motor-pump unit which is more cost-effective and requires reduced expenditure on assembly, the connecting rods are made of plastic, wherein in each case one tappet and one bearing are encapsulated with the material of the connecting rod. Alternatively, the connecting rods can be formed in one piece with the tappet and provided as sintered components.

8 Claims, 6 Drawing Sheets

(51) Int. Cl.
  *F16J 3/02*  (2006.01)
  *F04B 43/04* (2006.01)
  *B60T 17/02* (2006.01)

(56) References Cited

U.S. PATENT DOCUMENTS

| | | | | |
|---|---|---|---|---|
| 4,494,286 A | * | 1/1985 | Kaufman | 29/888.09 |
| 4,546,670 A | * | 10/1985 | Gaspardo | 74/595 |
| 4,571,160 A | * | 2/1986 | King et al. | 417/437 |
| 4,829,954 A | * | 5/1989 | Morgado | 123/193.6 |
| 4,842,498 A | * | 6/1989 | Bramstedt et al. | 417/571 |
| 5,554,014 A | * | 9/1996 | Becker | 417/413.1 |
| 5,687,633 A | * | 11/1997 | Eady | 92/97 |
| 5,799,565 A | * | 9/1998 | Bo | 92/187 |
| 2003/0103843 A1 | | 6/2003 | Seo | |
| 2007/0167910 A1 | * | 7/2007 | Tennican et al. | 604/110 |
| 2010/0045096 A1 | * | 2/2010 | Schonlau et al. | 303/10 |
| 2010/0202893 A1 | | 8/2010 | Bacher | |
| 2011/0271670 A1 | | 11/2011 | Krebs et al. | |

FOREIGN PATENT DOCUMENTS

| | | |
|---|---|---|
| DE | 102008005820 A1 | 3/2009 |
| DE | 102007005223 A1 | 6/2010 |
| DE | 102009054502 A1 | 6/2010 |

* cited by examiner

PRIOR ART

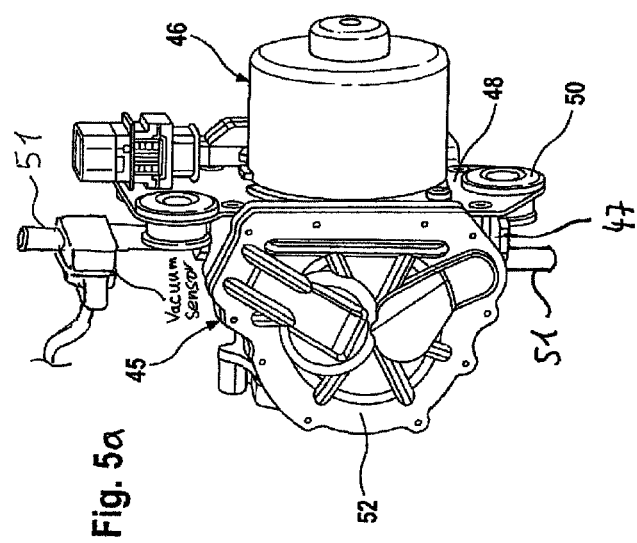

MOTOR PUMP UNIT

CROSS REFERENCE TO RELATED APPLICATIONS

This application is the U.S. National Phase Application of PCT International Application No. PCT/EP1010/069892, filed Dec. 16, 2010, which claims priority to German Patent Application No. 10 2009 054 941.2, filed Dec. 18, 2009, the contents of such applications being incorporated by reference herein.

FIELD OF THE INVENTION

The invention relates to a motor-pump unit in particular for providing pressure for a brake actuating device of a motor vehicle brake system having a pneumatic brake booster, in particular a vacuum brake booster, comprising a pump and an electric motor driving the pump, the pump being provided as a dual diaphragm pump having two opposed working diaphragms, each of which is clamped in between a pump casing and a working chamber cover and, as a result, delimits a working chamber, and which can be moved by means of a crank drive having connecting rods and bearings, it being possible for the working diaphragm to be connected firmly to a tappet and, together with the connecting rod, in each case forming a diaphragm unit.

BACKGROUND OF THE INVENTION

In order to provide vacuum for a pneumatic brake booster, the interior of which is subdivided into at least one vacuum chamber and a working chamber, use is made of vacuum pumps which suck residual air out of the vacuum chamber and expel it into the atmosphere. In the automobile industry, vane-cell pumps or swing-vane pumps are normally used for this purpose. As a result of their principle, these exhibit a great deal of friction and have to be lubricated in order to achieve an acceptable service life. Vacuum pumps with vanes driven by the internal combustion engine of the motor vehicle are therefore connected to the oil circuit of the internal combustion engine. Nevertheless, a noticeable proportion of the power output by the internal combustion engine has to be expended to drive such a pump. This is the case even when the vacuum in the chamber to be evacuated has already been built up completely. It is therefore expedient to operate the vacuum pump with electrical energy and to switch it on only when the absolute pressure in the vacuum chamber rises above a predetermined value.

Furthermore, in vehicles with electric or hybrid drive, the vacuum pump cannot be driven by the internal combustion engine or cannot be driven from time to time. Therefore, electrically driven vacuum pumps are used in these vehicles.

Equipping such an electrically driven pump with a lubricant circuit or connecting one to such a circuit would mean a disproportionately high expenditure. Thus, for use in motor vehicles having brake systems with electrically driven vacuum pump, only dry-running vacuum pumps are suitable. In vane-cell pumps, the self-lubricating material graphite is used for this purpose, from which the vanes are produced with the necessary precision with a great deal of effort. Therefore, efforts are directed at using a diaphragm pump for the electrical provision of braking vacuum.

A generic mode-pump unit is known, for example, from DE 10 2007 005 223 A1, which is incorporated by reference. The known motor-pump unit has a diaphragm unit with a working diaphragm which is firmly connected to a tappet. The tappet is in turn fixed to a connecting rod by welding or screwing.

SUMMARY OF THE INVENTION

There are already attempts to improve known motor-pump units. It is therefore an aim of the present invention to provide a low-noise motor-pump unit which, as compared with the known, generic unit, is more cost-effective and requires reduced expenditure on assembly.

According to aspects of the invention, this is achieved in that the connecting rods are made of plastic, in each case a tappet and a bearing being encapsulated with the material of the connecting rod. This produces a diaphragm unit which is cost-effective and optimized in terms of weight. The number of components can be reduced and the assembly simplified.

According to aspects of the invention, this is likewise achieved in that the connecting rods are in each case formed in one piece with the tappet and are provided as sintered components. Here, it is advantageous that the connecting rods can be produced simply and cost-effectively. In addition, the number of components can be reduced and assembly is simplified.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
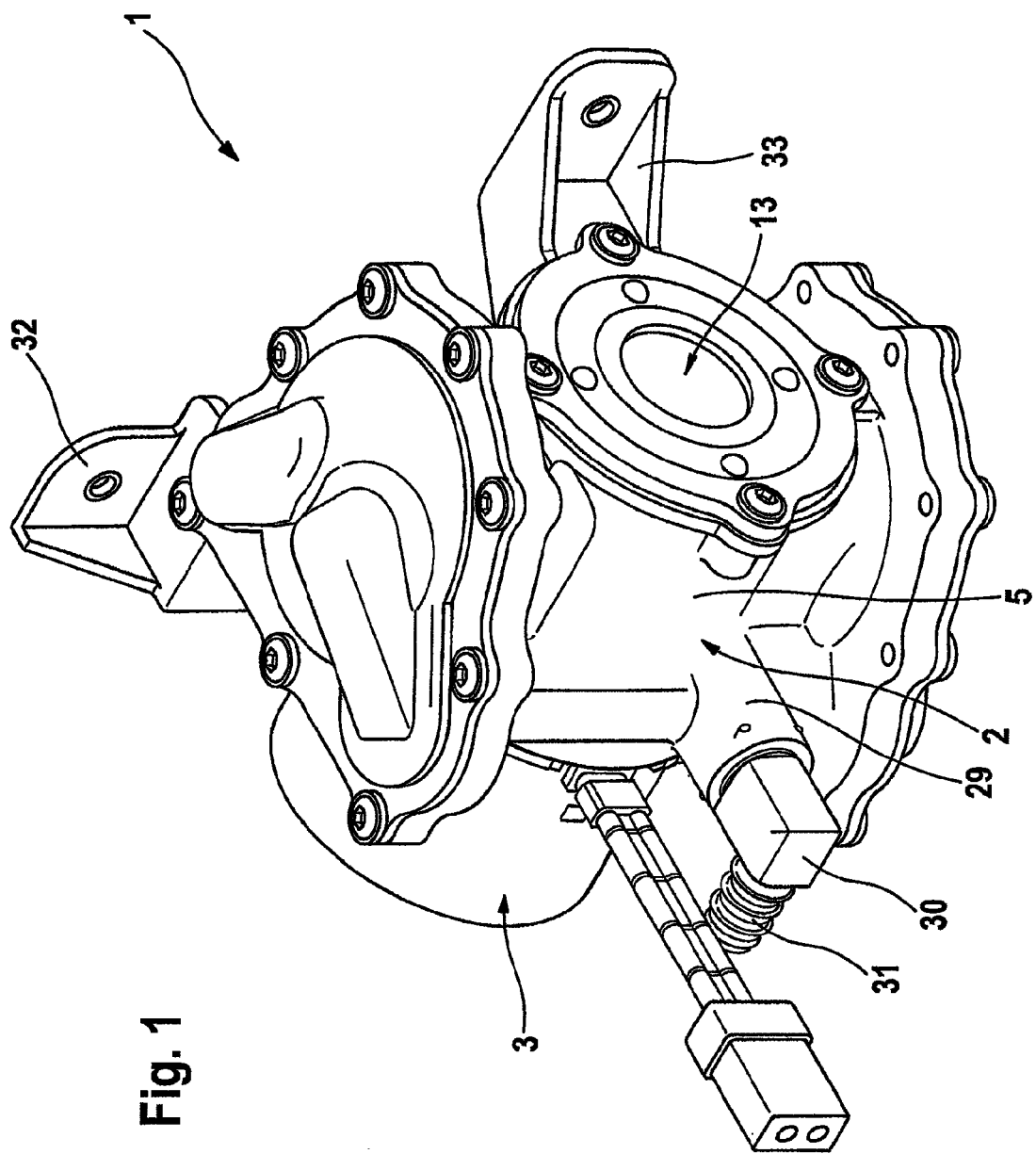
FIG. 1 shows a known motor-pump unit in a three-dimensional illustration.
Figure 2:
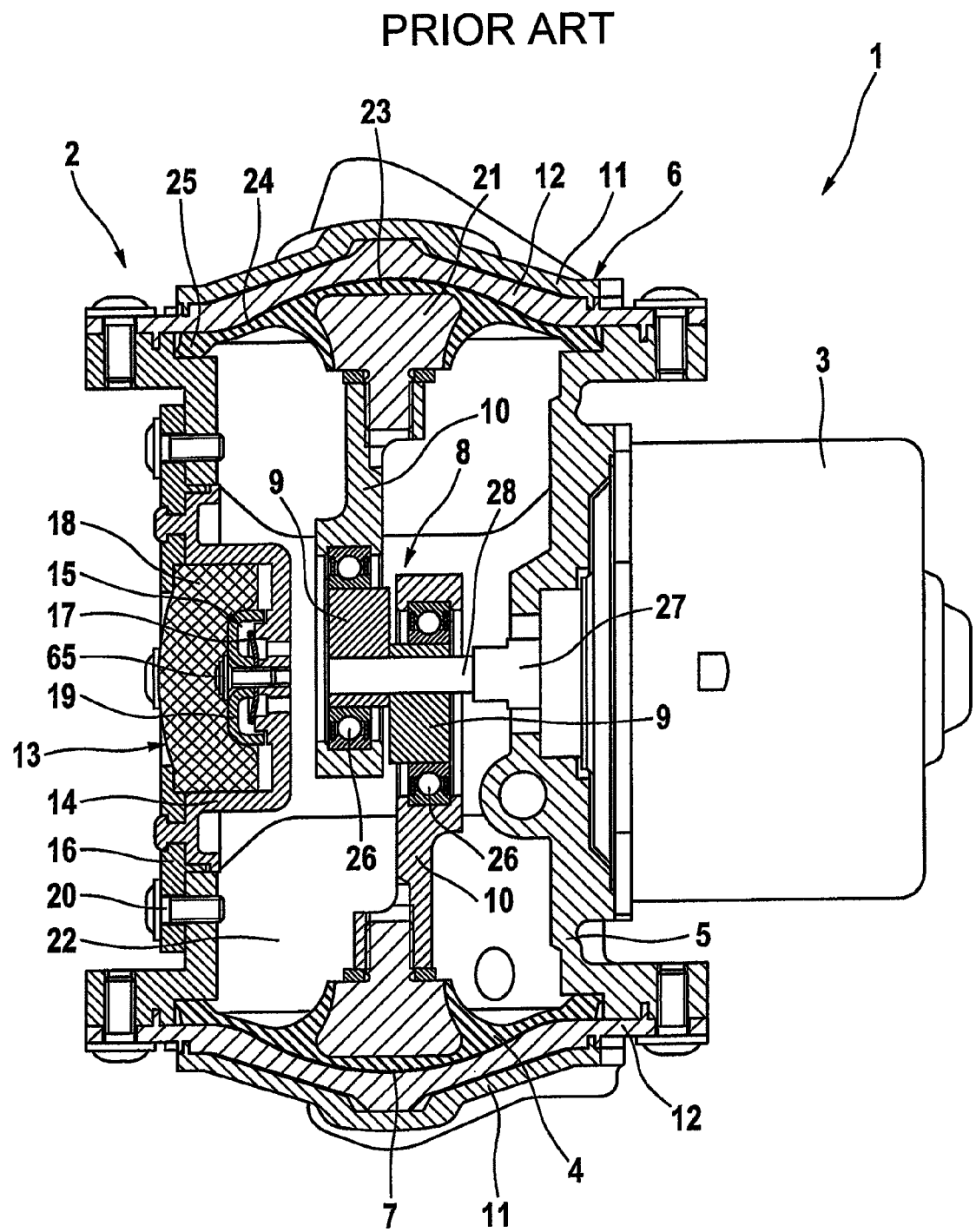
FIG. 2 shows the known motor-pump unit according to FIG. 1 in longitudinal section.

FIGS. 1 and 2 show a known motor-pump unit 1 according to DE 10 2007 005 223 A1 in a three-dimensional and sectioned illustration, said unit comprising a pump 2 having a pump casing 5 and an electric motor 3 driving the pump 2, it being possible for the motor 3 to be designed, for example, as a DC motor.

The pump 2 is provided as a dual diaphragm pump having two opposed working diaphragms 4, each of which is clamped in between the pump casing 5 and a working chamber cover 6 and, as a result, delimits a working chamber 7. The working diaphragms 4 can be moved in opposite directions by means of a crank drive 8 which comprises an eccentric 9 and a connecting rod 10 for each working diaphragm 4. The working chamber cover 6 has a top cover 11 and a bottom cover 12, which are welded, riveted or screwed to each other in an airtight manner.

Provided in the working chamber covers 6 are inlet and outlet valves, not shown. From the outlet valves, the expelled air is led via an outlet channel in each case in the working chamber covers 6 to an outlet channel in the pump casing 5, which are connected in an airtight manner by means of a sealing element. The two outlet channels in the pump casing 5 open into an internal chamber 22 of the pump casing 5, what is known as the crank chamber, which surrounds the crank drive 8.

An air outlet unit 13 provided in the pump casing 5 permits the air to be blown with little noise out of the internal chamber 22, which in this way serves as a sound damping chamber. Furthermore, the air outlet unit 13 comprises a non-return valve 15 having a one-piece or multi-part valve body 17, which stops air already expelled flowing back and also the penetration of liquid or gaseous substances into the internal chamber 22.

In addition, the airborne sound as the air emerges from the internal chamber 22 is reduced by the air outlet unit 13 having a filter 18 arranged in a filter housing 14, through which filter the air emerges into the atmosphere. Furthermore, the air outlet unit 13 comprises an air outlet cover 16, an air outlet closure cap 19 and the valve body 17 and can be provided as a pre-assembled subassembly. The air outlet cover 16, the air outlet closure cap 19 and the filter housing 14 are in each case fixed with screw elements 20, 65. As can be seen, the filter housing 14 is riveted to the air outlet cover 16. Further means, which are advantageously integrated into the air outlet unit 13 subassembly, can be provided for sound damping.

FIG. 2 further reveals that the working diaphragm 4 separates the working chamber 7 from the crank chamber 22 and is firmly connected to a tappet 21, it being possible for the non-deformable tappet 21 to be encapsulated by the elastically deformable material of the working diaphragm 4. As a result, in the surroundings of the tappet 21, a section 23 that is difficult to deform is produced in the center of the working diaphragm 4, and merges outward into the easily deformable section 24 of the working diaphragm 4, the latter in turn merging outward into a diaphragm bead 25, which is connected firmly to the pump casing 5 in an airtight manner. The tappet 21 can be connected firmly to the connecting rod 10 either by means of a welded connection or a threaded connection. The connecting rods 10 are mounted by means of ball bearings 26 such that they can move on the eccentrics 9. The working diaphragm 4 with the firmly connected tappet 21, together with the connecting rods 10 and the ball bearing 26, forms a diaphragm unit.

A motor shaft 27 in this exemplary embodiment is used simultaneously as an eccentric shaft 28, which carries the crank drive 8 having the eccentrics 9 and the connecting rods 11.

Provided on the pump casing 5 is a connection 29, shown in FIG. 1, with an adapter 30 fixed therein in a sealing manner, via which a connected brake booster is evacuated and to the adapter outlet 31 of which a vacuum hose, not shown, is fixed.

The connection 29 opens into a casing bore, not shown, which branches into two channels formed in the pump casing 5, which lead to the two working chamber covers 6. As a result, it is possible to configure the working chamber cover 6 in the same way for both sides of the pump 2. On the opposite side of the pump casing 5, a second connection 29 is provided. It is therefore possible, depending on the customer's preference and installation conditions of the motor-pump unit 1, to connect the adapter 30 on one side or the opposite side, it being necessary for the free connection 29 to be closed tightly with a plug.

In order to fix the motor-pump unit 1 in the vehicle, a plurality of fixing elements 32, 33 are fixed to the pump casing 5.

FIGS. 3 to 7, described below, reveal exemplary embodiments of motor-pump units according to aspects of the invention. Their function and fundamental structure does not differ from the known motor-pump unit, so that only the differences that are important for the invention will be discussed.

Figure 3:
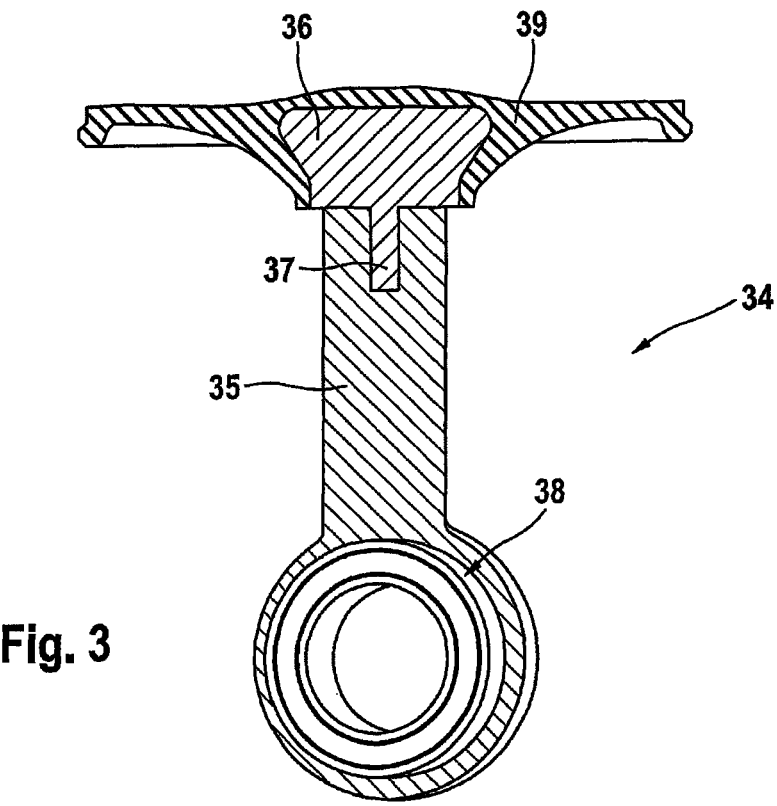
FIG. 3 shows a diaphragm unit of a first exemplary embodiment of a motor-pump unit according to aspects of the invention.

FIG. 3 shows a diaphragm unit 34 of a first exemplary embodiment. In order to provide a low-noise motor-pump unit which, as compared with the known unit 1, is more cost-effective and requires reduced expenditure on assembly, connecting rods 35 made of plastic are provided. For instance, thermosetting plastics can be used as suitable plastics. Here, a tappet 36, i.e. a projection 37 of the tappet 36, and a ball bearing 38 are encapsulated with the material of the connecting rod 35. In this way, a diaphragm unit 34 that is optimized in terms of weight is made possible and the assembly can be simplified substantially.

The production of the working diaphragm 4 is carried out by means of compression molding, the material of the working diaphragm 4 being pressed around the tappet 36 in the mold.

The working diaphragm 4 with tappet 36 and the ball bearing 38 are laid in a work piece for the purposes of producing the diaphragm unit 34 and encapsulated with the material of the connecting rod 35 in a form-fitting manner. In addition to the advantages already mentioned, the diaphragm unit 34 offers improved vibration characteristics as a result of the production described.

Figure 4:
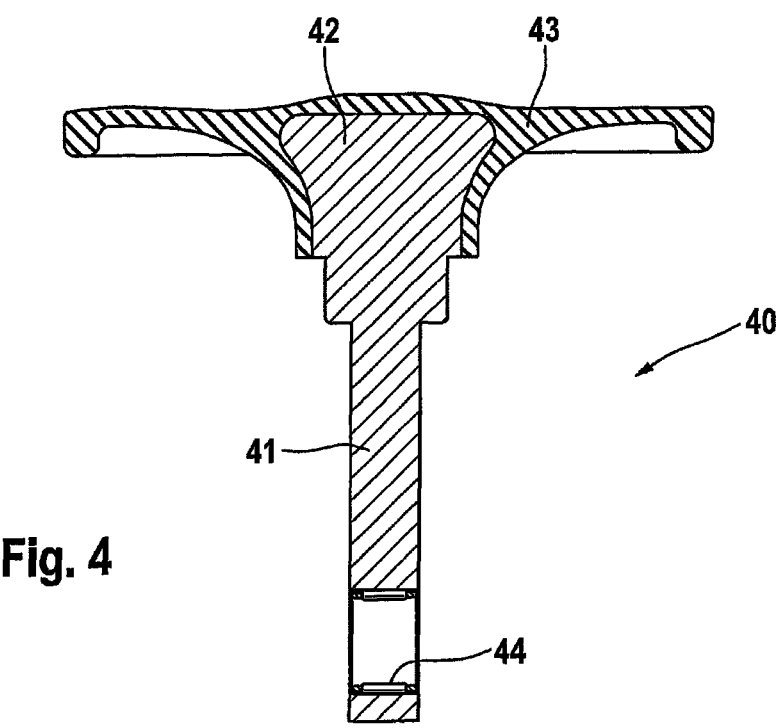
FIG. 4 shows a diaphragm unit of a second exemplary embodiment of a motor-pump unit according to aspects of the invention and FIG. 5 shows a motor-pump unit according to aspects of the invention in a three-dimensional illustration.

FIG. 4 reveals a diaphragm unit 40 of an alternative embodiment. In order to provide a low-noise motor-pump unit which, as compared with the known unit 1, is more cost-effective and requires reduced expenditure on assembly, provision is made here for a connecting rod 41 to be formed in one piece with a tappet 42 and to be provided as a sintered component. This configuration permits a cost-effective needle bearing 44 to be pressed in. A working diaphragm 43 is firmly connected to the connecting rod-tappet unit, for example by encapsulating the latter.

Figure 5:
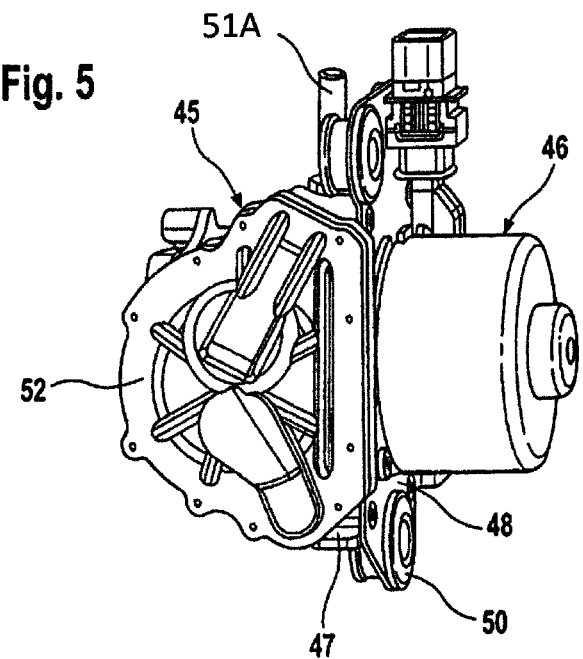
Figure 6:
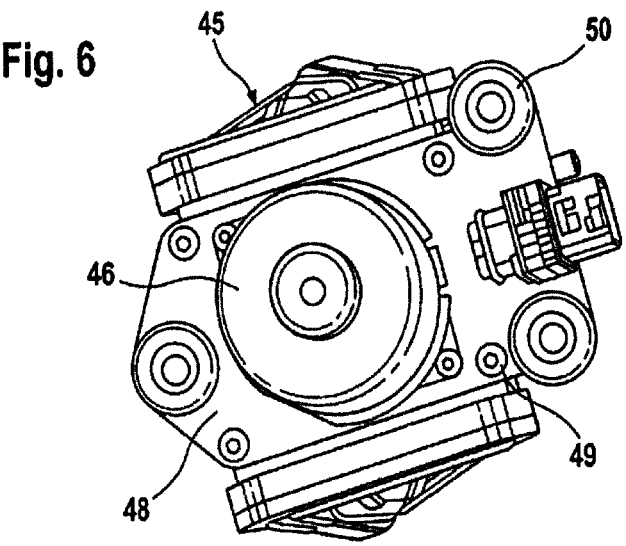
FIG. 6 shows a further view of the motor-pump unit according to FIG. 5 in a three-dimensional illustration.

FIGS. 5 and 6 illustrate a motor-pump unit comprising a pump 45 and a motor 46, in which the diaphragm units 34, 40 described above can be used.

A pump casing 47 of the pump 45 is made of plastic, which permits cost-effective production. As can be gathered from FIGS. 5 and 6, between the motor 46 and the pump casing 47 there is arranged a motor plate 48, which is fixed to a motor flange side of the pump casing 47 and blocks the EMC radiation emitted by the motor 46.

Affixing the motor 46 and the motor plate 48 to the pump casing 47 is carried out by means of screw elements 49, which are screwed directly into the pump casing 47.

In order to fix the motor-pump unit in the vehicle, sleeve-like retaining elements 50 are integrated into the motor plate 48, so that fitting separate retaining elements to the pump casing 47 can be dispensed with.

As has been described previously in relation to the known unit, the motor-pump unit can have two connections 51 for connecting the pump 45 to the brake booster, which connections open into casing bores that in each case branch into two channels formed in the pump casing 5, which lead to the two working chamber covers 52, which makes it possible to configure the working chamber cover 52 in the same way for both sides of the pump 45.

On the opposite side of the pump casing 5, a second connection 51 is then provided. It is therefore possible, depending on the customer's preference and installation conditions of the motor-pump unit, to connect the brake booster on one side or the opposite side. A vacuum sensor, not shown, can be arranged in a sealed manner in the free connection 51, in order to measure the vacuum generated by the pump 45. This information can be transmitted, for example, to a control and regulating unit for further evaluation.

Figure 7:
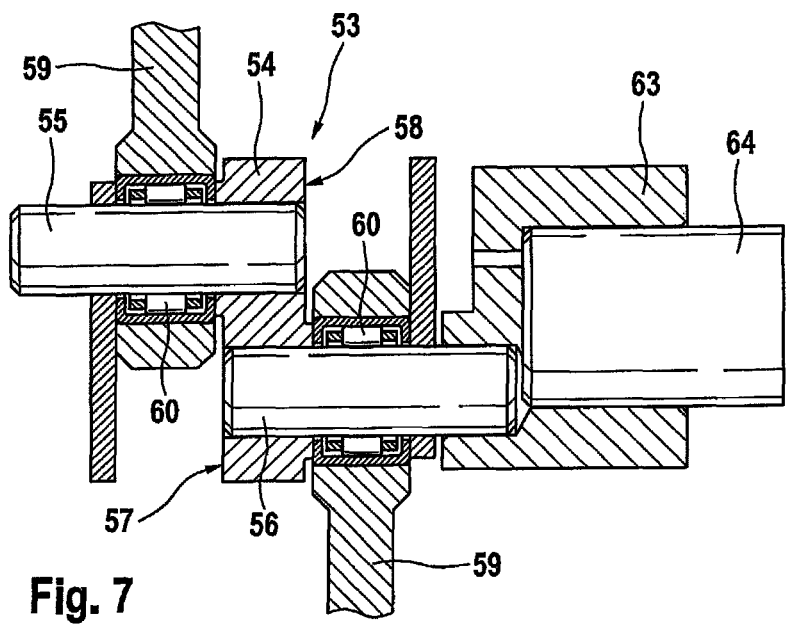
FIG. 7 shows a detail of a further exemplary embodiment of a motor-pump unit according to aspects of the invention and FIG. 8 shows the detail according to FIG. 7 in a three-dimensional illustration.
Figure 8:
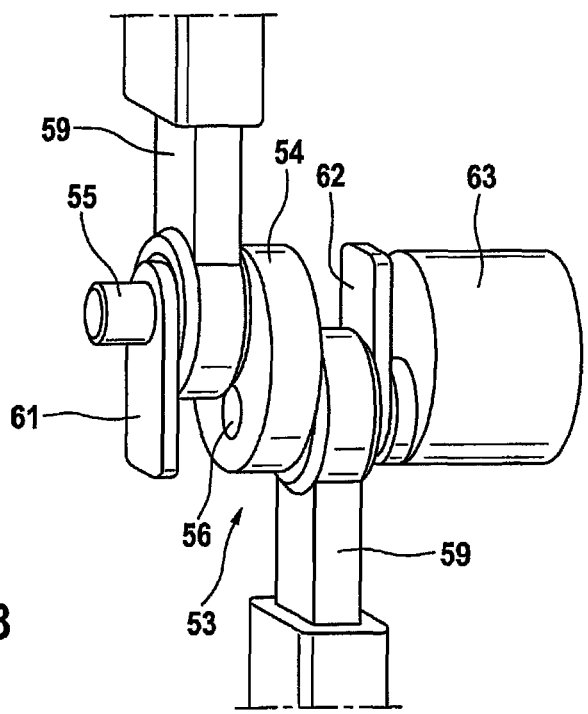

FIGS. 7 and 8 reveal a detail of a further exemplary embodiment. The partly sectioned details in each case show a crank drive 53. As distinct from the known crank drive 8 described in accordance with FIG. 2, the crank drive 53 has a disk-like holder 54 and two shafts 55, 56 fixed to the holder 54. As can be seen, the two shafts 55, 56 are arranged on opposite end faces 57, 58 of the holder 54 and are offset by 180° with respect to each other. Connecting rods 59 are rotatably mounted on the shafts 55, 56 via bearings 60, the bearings 60 being provided cost-effectively as needle bearings. By means of this structure of the crank drive 53, the eccentrics 9 described previously can be dispensed with entirely. Furthermore, balance weights 61, 62 for optimizing the vibration can be arranged in a straightforward manner on the shafts 55, 56.

The shaft 56 is rotatably connected to a motor shaft 64 by means of a connecting element 63.

The diaphragm units provided can be the above-described diaphragm units 34, 40. However, it is also possible for the crank drive 53 shown to be used in other motor-pump units, not described.

LIST OF DESIGNATIONS

1 Motor-pump unit
2 Pump
3 Motor
4 Working diaphragm
5 Pump casing
6 Working chamber cover
7 Working chamber
8 Crank drive
9 Eccentric
10 Connecting rod
11 Top cover
12 Bottom cover
13 Air outlet unit
14 Filter housing
15 Non-return valve
16 Air outlet cover
17 Valve body
18 Filter
19 Air outlet closure cap
20 Screw element
21 Tappet
22 Internal chamber
23 Section
24 Section
25 Diaphragm bead
26 Ball bearing
27 Motor shaft
28 Eccentric shaft
29 Connection
30 Adapter
31 Adapter outlet
32 Fixing element
33 Fixing element
34 Diaphragm unit
35 Connecting rod
36 Tappet
37 Projection
38 Ball bearing
39 Working diaphragm
40 Diaphragm unit
41 Connecting rod
42 Tappet
43 Working diaphragm
44 Needle bearing
45 Pump
46 Motor
47 Pump casing
48 Motor plate
49 Screw element
50 Retaining element
51 Connection
52 Working chamber cover
53 Crank drive
54 Holder
55 Shaft
56 Shaft
57 End face
58 End face
59 Connecting rod
60 Bearing
61 Balance weight
62 Balance weight
63 Connecting element
64 Motor shaft

The invention claimed is:

1. A motor-pump unit comprising: a pump and an electric motor driving the pump, the pump being provided as a dual diaphragm pump having two opposed working diaphragms, each of which is clamped in between a pump casing and a working chamber cover and, as a result, delimits a working chamber, and which can be moved by a crank drive having connecting rods and bearings, wherein each working diaphragm is connected firmly to a tappet and, together with the connecting rod, in each case forming a diaphragm unit, wherein the connecting rods are made of plastic material, wherein in each case the tappet includes a projection on a lower surface thereof, the projection extending toward the respective connecting rod and having an end surface, and wherein a cross section of the projection has a constant width from the lower surface of the tappet to the end surface, and wherein the lower surface of the tappet, entire side surface of the projection, and the entire end surface of the projection contact the plastic material of the connecting rod.

2. The motor-pump unit as claimed in claim 1, wherein the connecting rods are made of a thermosetting plastic.

3. The motor-pump unit as claimed in claim 2, wherein the production of the working diaphragm is carried out by compression molding.

4. The motor-pump unit as claimed in claim 1, wherein the production of the working diaphragm is carried out by compression molding.

5. The motor-pump unit as claimed in claim 1, wherein the pump casing is made of plastic and a motor plate is fixed between the pump casing and the electric motor.

6. The motor-pump unit as claimed in claim 5, wherein the motor plate has retaining elements for fixing the motor-pump unit to a vehicle.

7. The motor-pump unit as claimed in claim 1, having two connections provided on the pump casing, one connection being provided to connect the pump to a brake booster, wherein a vacuum sensor is arranged in one of the connections.

8. The motor-pump unit as claimed in claim 1, wherein the crank drive further comprises a disk-like holder and two shafts fixed to the disk-like holder, wherein the shafts are arranged on opposite end faces of the disk-like holder and offset with respect to each other, and the connecting rods are rotatably mounted on the shafts by the bearings.

* * * * *